United States Patent
Stern et al.

(10) Patent No.: US 9,513,723 B2
(45) Date of Patent: *Dec. 6, 2016

(54) INTERACTING TIPS FOR A DIGITIZER STYLUS

(71) Applicant: Microsoft Technology Licensing, LLC, Redmond, WA (US)

(72) Inventors: Yuval Stern, Even-Yehuda (IL); Ilan Geller, Pardesia (IL); Yair Leshem, Kfar-Saba (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/839,985

(22) Filed: Aug. 30, 2015

(65) Prior Publication Data

US 2015/0370354 A1    Dec. 24, 2015

Related U.S. Application Data

(63) Continuation of application No. 14/005,308, filed as application No. PCT/IL2012/050095 on Mar. 15, 2012, now Pat. No. 9,122,322.
(Continued)

(51) Int. Cl.
*G06F 3/033* (2013.01)
*G06F 3/0354* (2013.01)
(Continued)

(52) U.S. Cl.
CPC ........... *G06F 3/03545* (2013.01); *G06F 3/041* (2013.01); *G06F 3/044* (2013.01)

(58) Field of Classification Search
CPC ...... G06F 3/03545; G06F 3/041; G06F 3/044; G06F 3/046; G06K 9/222; B43K 8/22
(Continued)

(56) References Cited

U.S. PATENT DOCUMENTS 4,111,052 A    9/1978  Sniderman
4,451,698 A    5/1984  Whetstone et al.
(Continued)

FOREIGN PATENT DOCUMENTS

EP    0209467    1/1987
EP    2818981    12/2004
(Continued)

OTHER PUBLICATIONS

International Search Report and the Written Opinion Dated Mar. 6, 2014 From the International Searching Authority Re. Application No. PCT/IL2013/050836.
(Continued)

*Primary Examiner* — Kent Chang
*Assistant Examiner* — Mark Edwards
(74) *Attorney, Agent, or Firm* — Miia Kati Janette Sula; Teddy L. Bennett; Micky Minhas

(57) ABSTRACT

A stylus for use with a digitizer sensor includes a housing confined by a first and second end, a primary tip positioned at the first end of the housing and associated with a first transmitting element, the first transmitting element having a first diameter, a secondary tip positioned at the second end of the housing and associated with a second transmitting element, the second transmitting element having a second diameter that is larger than the first diameter, a transmitting unit for transmitting a first signal with a first amplitude via the first transmitting element and for transmitting a second signal with a second amplitude via the second transmitting element, wherein the first amplitude is at least twice the second amplitude and a powering unit for powering transmission of the first and second signal.

22 Claims, 9 Drawing Sheets

Related U.S. Application Data

(60) Provisional application No. 61/453,560, filed on Mar. 17, 2011.

(51) Int. Cl.
    *G06F 3/044* (2006.01)
    *G06F 3/041* (2006.01)

(58) Field of Classification Search
    USPC ...... 345/179; 178/19.01, 19.02, 19.03, 19.04
    See application file for complete search history.

(56) References Cited

U.S. PATENT DOCUMENTS

| | | | |
|---|---|---|---|
| 4,672,154 | A | 6/1987 | Rodgers et al. |
| 5,004,872 | A | 4/1991 | Lasley |
| 5,138,118 | A | 8/1992 | Russell |
| 5,225,637 | A * | 7/1993 | Rodgers ............... G06F 3/046 178/19.03 |
| 5,528,002 | A | 6/1996 | Katabami |
| 5,565,632 | A | 10/1996 | Ogawa |
| 5,571,997 | A | 11/1996 | Gray et al. |
| 5,576,502 | A * | 11/1996 | Fukushima ......... G06F 3/03545 178/19.01 |
| 5,581,052 | A | 12/1996 | Padula et al. |
| 5,793,360 | A | 8/1998 | Fleck et al. |
| 5,914,708 | A | 6/1999 | LaGrange et al. |
| 6,175,773 | B1 | 1/2001 | Reiffel et al. |
| 6,211,863 | B1 | 4/2001 | Chery et al. |
| 6,232,962 | B1 | 5/2001 | Davis et al. |
| 6,249,234 | B1 | 6/2001 | Ely et al. |
| 6,344,656 | B1 | 2/2002 | Hopkins et al. |
| 6,474,888 | B1 | 11/2002 | Lapstun et al. |
| 6,624,832 | B1 | 9/2003 | Thomas |
| 6,690,156 | B1 | 2/2004 | Weiner et al. |
| 6,707,451 | B1 | 3/2004 | Nagaoka |
| 6,727,439 | B2 | 4/2004 | Chao et al. |
| 6,853,369 | B2 | 2/2005 | Fukushima et al. |
| 6,972,754 | B2 | 12/2005 | Zank |
| 7,145,555 | B2 | 12/2006 | Taylor et al. |
| 7,202,862 | B1 | 4/2007 | Palay et al. |
| 7,210,046 | B2 | 4/2007 | Truong |
| 7,279,646 | B2 | 10/2007 | Xu |
| 7,292,229 | B2 | 11/2007 | Morag et al. |
| 7,367,242 | B2 | 5/2008 | Xi et al. |
| 7,372,455 | B2 | 5/2008 | Perski et al. |
| 7,436,397 | B2 | 10/2008 | Zank |
| 7,778,795 | B2 | 8/2010 | Fukushima et al. |
| 7,843,439 | B2 | 11/2010 | Perski et al. |
| 7,955,017 | B2 | 6/2011 | Lapstun et al. |
| 8,212,795 | B2 | 7/2012 | Henry |
| 8,228,299 | B1 | 7/2012 | Maloney et al. |
| 8,481,872 | B2 | 7/2013 | Zachut |
| 8,536,471 | B2 | 9/2013 | Stern et al. |
| 8,629,358 | B2 | 1/2014 | Rimon et al. |
| 8,686,964 | B2 | 4/2014 | Rimon |
| 8,780,089 | B2 | 7/2014 | Yuan et al. |
| 9,063,591 | B2 | 6/2015 | Alameh et al. |
| 9,116,558 | B2 | 8/2015 | Yilmaz et al. |
| 9,158,393 | B2 | 10/2015 | Vlasov |
| 9,218,073 | B1 | 12/2015 | Kremin et al. |
| 2002/0040817 | A1 | 4/2002 | LeKuch et al. |
| 2005/0110777 | A1 | 5/2005 | Geaghan et al. |
| 2005/0166076 | A1 | 7/2005 | Truong |
| 2006/0068851 | A1 | 3/2006 | Ashman, Jr. |
| 2006/0109252 | A1 | 5/2006 | Kolmykov-Zotov et al. |
| 2006/0267966 | A1 | 11/2006 | Grossman et al. |
| 2007/0014490 | A1 | 1/2007 | Silverbrook et al. |
| 2007/0085836 | A1 | 4/2007 | Ely |
| 2007/0146351 | A1 * | 6/2007 | Katsurahira ......... G06F 3/03545 345/179 |
| 2007/0176909 | A1 | 8/2007 | Pavlowski |
| 2008/0128180 | A1 | 6/2008 | Perski et al. |
| 2009/0078476 | A1 | 3/2009 | Rimon et al. |
| 2009/0114459 | A1 | 5/2009 | Fukushima et al. |
| 2009/0122029 | A1 | 5/2009 | Sin |
| 2009/0262637 | A1 | 10/2009 | Badaye et al. |
| 2009/0289922 | A1 | 11/2009 | Henry |
| 2010/0006350 | A1 | 1/2010 | Elias |
| 2010/0051356 | A1 | 3/2010 | Stern et al. |
| 2010/0084203 | A1 | 4/2010 | Peng |
| 2010/0107770 | A1 | 5/2010 | Serban et al. |
| 2010/0155153 | A1 | 6/2010 | Zachut |
| 2010/0214252 | A1 | 8/2010 | Wu |
| 2012/0050231 | A1 | 3/2012 | Westhues et al. |
| 2012/0228039 | A1 | 9/2012 | Hinson et al. |
| 2012/0327040 | A1 | 12/2012 | Simon et al. |
| 2013/0141398 | A1 | 6/2013 | Cho et al. |
| 2013/0265265 | A1 | 10/2013 | Stern |
| 2013/0321355 | A1 | 12/2013 | Teiblum |
| 2014/0002422 | A1 | 1/2014 | Stern et al. |
| 2014/0132529 | A1 | 5/2014 | Jeong |
| 2014/0210781 | A1 | 7/2014 | Stern |
| 2015/0070330 | A1 | 3/2015 | Stern |
| 2015/0116289 | A1 | 4/2015 | Stern et al. |
| 2016/0124530 | A1 | 5/2016 | Stern |

FOREIGN PATENT DOCUMENTS

| | | |
|---|---|---|
| EP | 2187288 | 5/2010 |
| EP | 2204724 | 7/2010 |
| EP | 1349056 | 7/2011 |
| EP | 2650758 | 10/2013 |
| WO | WO 01/24157 | 4/2001 |
| WO | WO 02/41129 | 5/2002 |
| WO | WO 2009/143046 | 11/2009 |
| WO | WO 2010/086035 | 8/2010 |
| WO | WO 2012/123951 | 9/2012 |
| WO | WO 2013/160887 | 10/2013 |
| WO | WO 2014/043239 | 3/2015 |
| WO | WO 2016/020818 | 2/2016 |

OTHER PUBLICATIONS

Notice of Allowance Dated Feb. 3, 2015 From the US Patent and Trademark Office Re. U.S. Appl. No. 13/908,063.
Notice of Allowance Dated Mar. 22, 2013 From the US Patent and Trademark Office Re. U.S. Appl. No. 12/546,753.
Official Action Dated Jul. 3, 2012 From the US Patent and Trademark Office Re. U.S. Appl. No. 12/546,753.
Official Action Dated Jun. 3, 2014 From the US Patent and Trademark Office Re. U.S. Appl. No. 13/908,063.
Official Action Dated Dec. 19, 2013 From the US Patent and Trademark Office Re. U.S. Appl. No. 13/908,063.
Official Action Dated Oct. 19, 2012 From the US Patent and Trademark Office Re. U.S. Appl. No. 12/546,753.
Official Action Dated Jan. 31, 2012 From the US Patent and Trademark Office Re. U.S. Appl. No. 12/546,753.
Hoffman "Not All Tablet Styluses Are Equal: Capacity, Wacom, and Bluetooth Explained", How-to-Geek, 4 P., Sep. 12, 2013.
IBM "Automatic Switching Stylus for Pen-Based Computer Systems", IBM Technical Disclosure Bulletin, XP000419075, 36(12): 583-584, Dec. 1, 1993.
Jones "Stylus Reviews: TrueGlide Apex Review", iPad for Artists, 4 P., Nov. 21, 2013.
Communication Relating to the Results of the Partial International Search Dated Jul. 25, 2012 From the International Searching Authority Re. Application No. PCT/IL2012/050095.
International Preliminary Report on Patentability Dated Sep. 26, 2013 From the International Bureau of WIPO Re. Application No. PCT/IL2012/050095.
International Search Report and the Written Opinion Dated Sep. 7, 2012 From the International Searching Authority Re. Application No. PCT/IL2012/050095.
Official Action Dated Nov. 25, 2014 From the US Patent and Trademark Office Re. U.S. Appl. No. 14/005,308.
Notice of Allowance Dated Apr. 24, 2015 From the US Patent and Trademark Office Re. U.S. Appl. No. 14/005,308.
Invitation to Pay Additional Fees Dated May 31, 2016 From the International Preliminary Examining Authority Re. Application No. PCT/IB2015/055863.

(56) References Cited

OTHER PUBLICATIONS

Official Action Dated May 5, 2016 From the US Patent and Trademark Office Re. U.S. Appl. No. 14/395,837.
Official Action Dated May 6, 2016 From the US Patent and Trademark Office Re. U.S. Appl. No. 14/451,448.
Communication Relating to the Results of the Partial International Search Dated 13 Oct. 2015 From the International Searching Authority Re. Application No. PCT/IB2015/055863.
International Preliminary Report on Patentability Dated Nov. 6, 2014 From the International Bureau of WIPO Re. Application No. PCT/IL2012/050143.
International Search Report and the Written Opinion Dated Jan. 16, 2013 From the International Searching Authority Re. Application No. PCT/IL2012/050143.
International Search Report and the Written Opinion Dated Jan. 26, 2016 From the International Searching Authority Re. Application No. PCT/IB2015/055863.
Official Action Dated Oct. 8, 2015 From the US Patent and Trademark Office Re. U.S. Appl. No. 14/395,837.
Official Action Dated Oct. 21, 2015 From the US Patent and Trademark Office Re. U.S. Appl. No. 14/451,448.
Song et al. "Grips and Gestures on a Multi-Touch Pen", Proceedings of the SIGCHI Conference on Human Factors in Computing Systems, CHI'11, Session: Flexible Grips & Gestures, Vancouver, BC, Canada, May 7-12, 2011, p. 1323-1332, May 2011.

\* cited by examiner

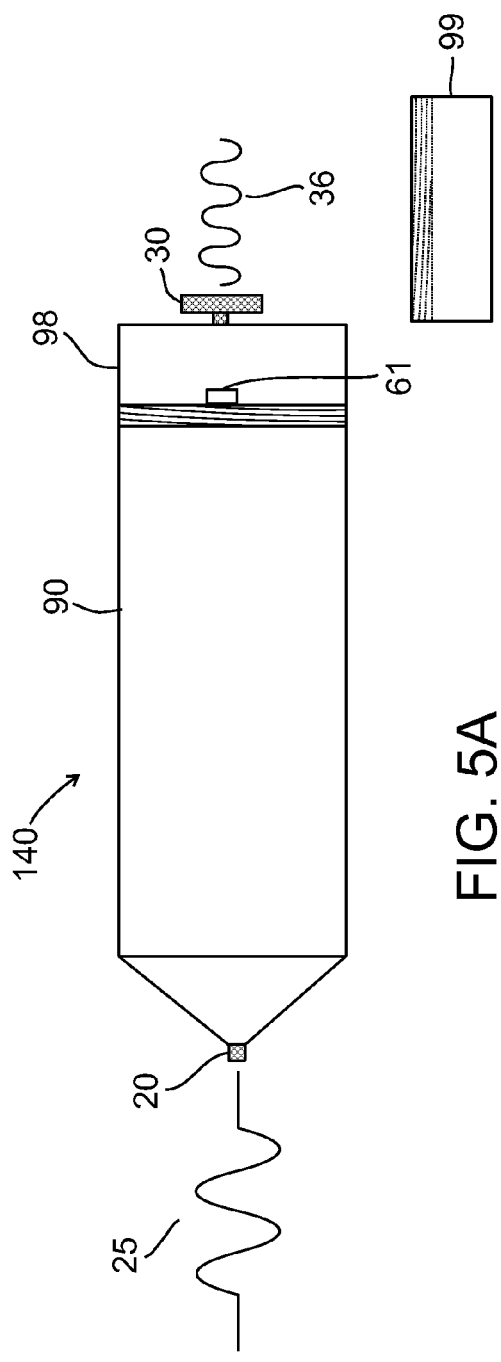
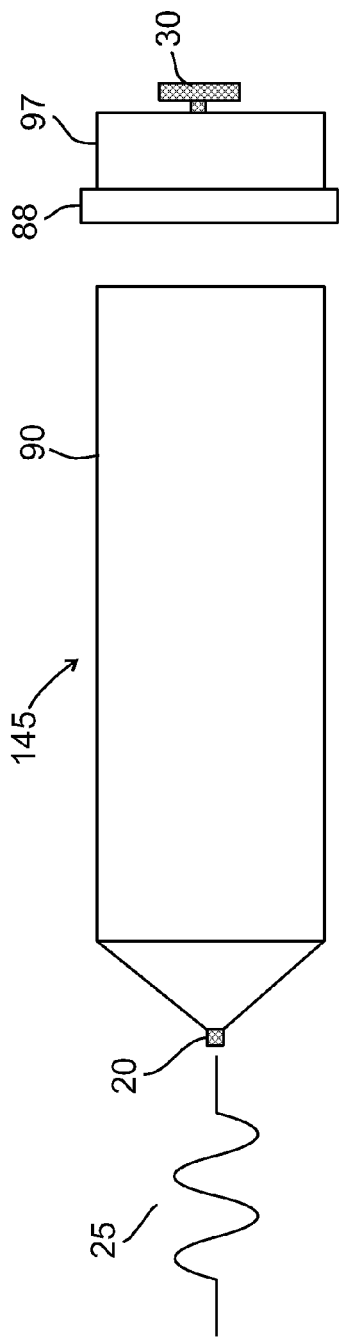
FIG. 5A
FIG. 5B

INTERACTING TIPS FOR A DIGITIZER STYLUS

RELATED APPLICATIONS

This application is a continuation of U.S. patent application Ser. No. 14/005,308 filed on Sep. 16, 2013, which is a National Phase of PCT Patent Application No. PCT/IL2012/050095 having International filing date of Mar. 15, 2012, which claims the benefit of priority under 35 USC §119(e) of U.S. Provisional Patent Application No. 61/453,560 filed on Mar. 17, 2011. The contents of the above applications are all incorporated by reference as if fully set forth herein in their entirety.

FIELD OF THE INVENTION

The present invention, in some embodiments thereof, relates to a stylus for use with a digitizer sensor, and more particularly, but not exclusively, to interacting tips for a stylus.

BACKGROUND OF THE INVENTION

Touch technologies are commonly used as input devices for a variety of products. The usage of touch devices of various kinds is growing sharply due to the emergence of new mobile devices such as mobile phones, Personal Digital Assistants (PDA), tablet PCs, wireless flat panel displays (FPD) and other devices. Some of these devices are not connected to standard keyboards, mice or like input devices, which are deemed to limit their mobility. Instead there is a tendency to use touch input technologies of one kind or another, such as using a stylus and/or finger for user interaction.

Styluses are known in the art for use with a digitizer sensor. Position detection of the stylus provides input to a computing device associated with the digitizer sensor and is interpreted as user commands. Position detection is performed while the stylus tip is either touching and/or hovering over a detection surface of the digitizer sensor. Often, the digitizer sensor is integrated with a display screen and a position of the stylus over the screen is correlated with virtual information portrayed on the screen.

U.S. Patent Application Publication No. 2010/0155153 entitled "Digitizer, Stylus and Method of Synchronization Therewith," describes a method for operating a digitizer with an autonomous asynchronous stylus. Typically the stylus is self-powered, e.g. battery operated. The method includes sampling outputs from a digitizer, detecting from the outputs at least one pulsed signal transmitted from an autonomous asynchronous stylus at a defined rate, determining a location of the stylus interaction with respect to the digitizer, and tracking stylus interaction with the digitizer over subsequent pulsed signals transmitted from the stylus.

U.S. Patent Application Publication No. 2007/0146351 entitled "Position Input Device and Computer System," the content of which is incorporated herein by reference describes a computer system including a position pointing device for transmitting position signals. The position pointing device includes a built-in power supply unit, a plurality of signal transmitting units provided at a plurality of portions of the position pointing device, and a power control unit for controlling transmission power of each of a plurality of signal transmitting units.

U.S. Pat. No. 7,292,229 entitled "Transparent Digitizer" which is assigned to N-trig Ltd., the contents of which is incorporated herein by reference, describes a passive electro-magnetic stylus which is triggered to oscillate at a resonant frequency by an excitation coil surrounding a digitizer. The stylus operates in a number of different states including hovering, tip touching, right click mouse emulation, and erasing. The various states are identified by dynamically controlling the resonant frequency of the stylus so that the stylus resonates at a different frequency in each state. There is also described a stylus including both a front tip and a reverse tip, the reverse tip located at a second end of the stylus remote from the front tip. Both the front tip and the reverse tip are associated with a same resonant circuit, and an electric field concentration is created in a gap formed in the vicinity of each of the front tip and the reverse tip in response to triggering the stylus at the resonant frequency. A position of a tip of the stylus, e.g. the front tip and/or the reverse tip with respect to the digitizer sensor is determined based on signals sensed by the sensor. It is described that a detectable difference between output from the front and reverse tips is obtained by forming a gap in the vicinity of the front tip with a different geometry than that of a gap in the vicinity of the reverse tip.

U.S. Pat. No. 7,843,439, entitled "Touch Detection for a Digitizer" assigned to N-Trig Ltd., the contents of which is incorporated herein by reference, describes a detector for detecting both a stylus and touches by fingers or like body parts on a digitizer sensor. The detector typically includes a digitizer sensor with a grid of sensing conductive lines, a source of oscillating electrical energy at a predetermined frequency, and detection circuitry for detecting capacitive influence on the sensing conductive lines when the oscillating electrical energy is applied, the capacitive influence being interpreted as a touch. The detector is capable of detecting simultaneous occurrences of multiple styluses and/or finger touches.

U.S. Pat. No. 5,793,360 entitled "Digitizer Eraser System and Method," the contents of which is incorporated herein by reference, describes writing/erasing digitizer pen including a resonance tuning circuit associated with a writing tip of the pen and a separate resonance tuning circuit associated with the erasing tip of the pen. A phase output of the resonance tuning circuit of the eraser tip is altered responsive to pressure applied on the eraser tip. A digitizer sensor detects the change in phase and identifies that input is being received from the eraser tip. The eraser tip is used to select and delete text, cells or other objects displayed on an associated display screen.

U.S. Pat. No. 5,576,502 entitled "Pointing Unit and Improved Stylus Pen," the contents of which is incorporated herein by reference, describes an eraser unit or pointing unit for a second pen unit of a pressure sensitive stylus. The eraser unit includes a main body with a dome shaped cap that is inserted in an opening of a main body of the stylus. The cylindrical main body with the dome shaped cap is movable with respect to the main body of the stylus and recedes toward the main body of the stylus responsive to pressure applied on the cap.

SUMMARY OF THE INVENTION

According to an aspect of some embodiments of the present invention there is provided a stylus including a primary tip and/or writing tip on one end and a secondary tip on an opposite end of the stylus. According to some embodiments of the present invention, each of the writing tip and the secondary tip is capable of providing input to an associated digitizer and/or touch screen when brought in proximity to a sensing surface of the digitizer and/or touch screen. According to some embodiments of the present invention, the secondary tip includes power saving features.

According to an aspect of some embodiments of the present invention there is provided one or more secondary tips, each of which can be retrofitted on an existing stylus. In some exemplary embodiments, the secondary tip is an add-on device that can be selectively and/or repeatedly mounted and dismounted on a stylus by the user. Optionally, a kit including a plurality of secondary tips is provided for operation with a stylus, each of which is operable to provide dedicated functionality when mounted on the stylus for interacting with the digitizer.

According to an aspect of some embodiments of the present invention there is provided a stylus for use with a digitizer sensor, the stylus including a housing confined by a first and second end, a primary tip positioned at the first end of the housing and associated with a first transmitting element, the first transmitting element having a first diameter, a secondary tip positioned at the second end of the housing and associated with a second transmitting element, the second transmitting element having a second diameter that is larger than the first diameter, a transmitting unit for transmitting a first signal with a first amplitude via the first transmitting element and for transmitting a second signal with a second amplitude via the second transmitting element, wherein the first amplitude is at least twice the second amplitude, and a powering unit for powering transmission of the first and second signal.

Optionally, the first amplitude is at least five times the second amplitude.

Optionally, the second diameter is at least twice the first diameter.

Optionally, the second diameter is at least 3 mm.

Optionally, the second diameter is at least 5 mm.

Optionally, the second transmitting element is a conductive portion of the secondary tip.

Optionally, the secondary tip has a dome shape.

Optionally, the secondary tip is formed from conductive rubber.

Optionally, the secondary tip is coated with non-conductive material.

Optionally, the second signal is a modulated form of the first signal.

Optionally, modulation includes at least one of frequency and phase modulation.

Optionally, the first and second signals are burst signals and wherein modulation includes modulation of a repetition rate of the bursts.

Optionally, the stylus includes a tip position detecting unit operative for differentiating between a touch and hover operational state of the secondary tip of the stylus.

Optionally, the tip position detecting unit includes a contact switch that is activated by the secondary tip responsive to contact pressure applied on the secondary tip.

Optionally, the stylus includes a signal modulation circuitry operative to modulate a signal responsive to identifying the touch operation state of the secondary tip of the stylus.

Optionally, the stylus includes circuitry for blocking transmission of the first signal responsive to identifying a touch operational state of the secondary tip of the stylus.

Optionally, the stylus includes circuitry for blocking transmission of the second signal responsive to identifying a touch operational state of the primary tip of the stylus.

Optionally, the stylus includes circuitry for blocking transmission of the second signal responsive to identifying a hover operational state.

Optionally, the first and second signals are transmitted simultaneously.

Optionally, the first and second signals are burst signals that are transmitted at a pre-defined frequency.

Optionally, the stylus includes a first transmitting unit for transmitting the first signal and a second signal transmitting unit for transmitting the second signal, wherein the first and second transmitting units are operated independently.

Optionally, the stylus includes a first powering unit for powering transmission of the first signal and a second powering unit for powering transmission of the second signal, wherein the first and second powering units are independent.

Optionally, the secondary tip, the second powering unit and the second transmitting unit are housed in second housing selectively detachable from the housing.

According to an aspect of some embodiments of the present invention there is provided a stylus for use with a digitizer sensor, the stylus including a housing confined by a first and second end, a primary tip positioned at the first end of the housing and associated with a transmitting element, the transmitting element having a first diameter, a transmitting unit for transmitting a signal via the transmitting element, a powering unit for powering transmission of the signal via the transmitting element, and a secondary tip positioned at the second end of the housing, wherein the secondary tip is a passive tip formed from conductive material, the secondary tip having a diameter of at least 3 mm.

Optionally, the secondary tip is formed from conductive rubber.

Optionally, the secondary tip is movable with respect to the housing and recedes toward the housing responsive to contact pressure applied on the secondary tip.

Optionally, the stylus includes a contact switch that is activated in response to the secondary tip receding toward the housing by a defined distance.

Optionally, responsive to activation of the contact switch, the secondary tip is grounded via a low impedance connection.

Optionally, the stylus includes circuitry operable to switch, at a pre-defined frequency, between high and low impedance connection to GND responsive to activation of the contact switch.

Optionally, the secondary tip and the contact switch are housed in a separate housing that is selectively detachable from the housing of the stylus.

According to an aspect of some embodiments of the present invention there is provided interacting tip unit operable for providing input to a digitizer sensor, wherein the interactive tip unit comprises an interacting tip formed of conductive material having a dimension of at least 3 mm, the interacting tip unit adapted for retrofitting on one end of a stylus associated with the digitizer sensor.

Optionally, the interactive tip includes a housing, a transmitting unit for transmitting a signal via the interacting tip, and a powering unit for powering transmission of the signal.

Optionally, the interactive tip includes circuitry for modulating the signal responsive to detecting contact pressure applied on the interacting tip.

Optionally, the interacting tip is dome shaped.

Optionally, the interacting tip is formed from conductive rubber.

According to an aspect of some embodiments of the present invention there is provided a stylus kit including a stylus for use with a digitizer sensor, the stylus with a housing confined by a first and second end, a primary tip positioned at the first end of the housing and associated with a first transmitting element, the first transmitting element having a first diameter, a transmitting unit for transmitting a first signal with a first amplitude via the first transmitting, and a powering unit for powering transmission of the first signal, and a plurality of secondary tips units operable to be attached to the stylus, wherein each of the plurality of secondary tip units is operable to provide input to the digitizer sensor.

Optionally, each of the plurality of secondary tip units provides dedicated functionality selected from the group consisting of: erasing, drawing with a wide line, and drawing with a defined color.

Optionally, at least one of the plurality of secondary tip units is operable to transmit a signal.

Optionally, at least one of the plurality of secondary tip units comprises a tip position detecting unit for identifying touch and hover operations states of the secondary tip unit.

Optionally, at least one secondary tip unit from the plurality of secondary tip units is operable to transmit a signal with amplitude that is at most half the amplitude of the first signal transmitted by the first transmitting element.

Optionally, at least one secondary tip unit from the plurality of secondary tip units includes a tip with a diameter that is at least double a diameter of the first transmitting element.

According to an aspect of some embodiments of the present invention there is provided a stylus for use with a digitizer sensor, the stylus including a housing confined by a first and second end, a tip positioned at the first end of the housing and associated with a first transmitting element, a first conductive area substantially surrounding the tip and electrically isolated from the first transmitting element, a first conductive area substantially surrounding the tip and electrically isolated from the first transmitting element, wherein the first conductive area and the second conductive area are electrically isolated from each other, circuitry for transmitting a signal via the first transmitting element, wherein the circuitry is electrically connected at a first end to the transmitting element and at a second end to at least the first conductive area, and a switching element for selectively connecting the circuitry at the second end to the second conductive area.

Optionally, a tip pressure detecting unit associated with the tip for detecting pressure applied on the tip, wherein the switching element is operable to connect the circuitry at the second end to the second conductive area, responsive to a pre-defined detected pressure on the tip.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A and 5B are simplified diagrams of exemplary styluses retrofitted with exemplary secondary tip units in accordance with some embodiments of the present invention;

DESCRIPTION OF SPECIFIC EMBODIMENTS OF THE INVENTION

Figure 1:
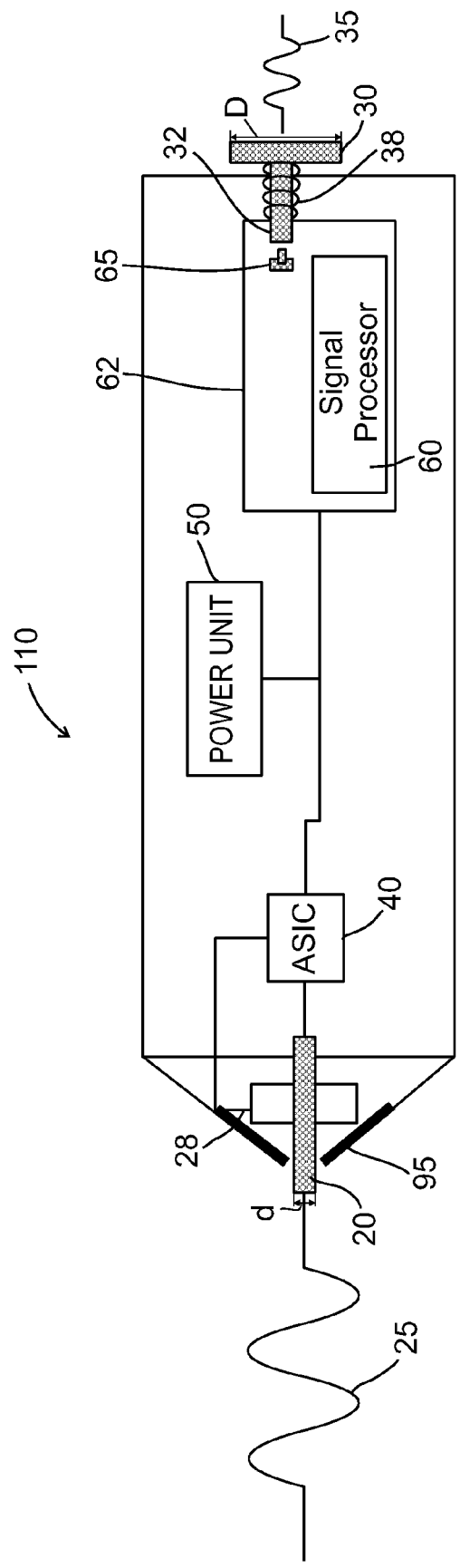
FIG. 1 is a simplified diagram of an exemplary stylus including a primary tip and an exemplary secondary tip that emits a signal derived from circuitry of the primary tip in accordance with some embodiments of the present invention.

As used herein, the term tip, e.g. as in the phrases secondary tip, eraser tip, conductive tip, primary tip, writing tip, means any end of a stylus used to interact with a digitizer sensor and/or touch screen. It is noted that the term "tip" as stated herein does not require that the end be tapered or pointed.

The present invention, in some embodiments thereof, relates to a stylus for use with a digitizer sensor, and more particularly, but not exclusively, to interacting tips for a stylus.

According to some embodiments of the present invention, the functionality of a stylus is improved by including an additional interacting tip on an end opposite that of a writing tip of the stylus. According to some embodiments of the present invention, the secondary tip provides additional functionality such as for example erasing, marking, drawing wide lines and/or drawing with selected colors, or others. Optionally, a functionality of the secondary tip is selected by a user with a switch included on the stylus. Optionally, a functionally of the secondary tip is selected with a select feature displayed on an associated touch screen. Optionally, a secondary tip is associated with a specific functionality so that selection is not required.

In some known styluses that include both writing and an eraser tips, a signal is typically transmitted from both tips throughout operation of the stylus. Typically, transmission is from a conductive portion of a tip that operates as an antenna. Optionally, the conductive portion is coated with non-conductive material. Typically, transmission from both tips is required since each of the writing tip and eraser tip may operate in a hover mode as well as in a touch mode. During a hover mode of a stylus, a stylus is typically unaware of its orientation, e.g. unaware of which tip is interacting with the digitizer sensor. The present inventors have found that one of the potential draw backs of a battery operated stylus with two signal transmitting tips, e.g. a primary and secondary tip, is a significant increase in power required and/or significant reduction in battery life that may occur due to the additional continuous transmission that may be required from the secondary tip. Another potential drawback is the increase in the bill of materials associated with adding an additional signal transmitting tip to the stylus.

The present inventors have found that functionalities typically associated with an secondary tip of a stylus are functionalities that are used less often and/or for shorter periods of time as compared to functionalities provided by the writing tip and/or primary tip of the stylus, and that the accuracy required for many of these functionalities is typically lower than the accuracy required for functionalities assigned to the primary tip, e.g. the writing tip of the stylus. Based on these observations, the present inventors have found that it may be beneficial to improve battery life and/or reduce power requirement by transmitting a lower amplitude signal at the secondary tip. In some exemplary embodiment, amplitude of signal transmitted in the secondary tip is between 2-20 times less than that of the primary tip stylus. The present inventors have found that a same SNR on the digitizer, e.g. same and/or similar SNR obtained from the primary tip can be maintained with the secondary tip when transmitting a lower amplitude signal with a thicker antenna. According to some embodiments of the present invention, in order to comply with the lower power transmission, dimensions of a conductive portion of the secondary tip are increased so that detection of a lower amplitude transmission can be enhanced and/or so that the transmission power can be further reduced. Optionally, a diameter and/or at least one dimension of a conductive and/or transmitting portion of the secondary tip is 2-10 times larger than a diameter and/or corresponding dimension of a conductive and/or transmitting portion of the primary tip.

In some exemplary embodiments, performance of a stylus including two transmitting tips is further improved by blocking transmission of one of the two tips while the other tip is operating in a touch operation mode. Typically, each of the primary and secondary tips is associated with a pressure detecting mechanism for sensing contact pressure applied on the tip during a touch operational state. In response to determining a touch operation mode for one of the tips, transmission may be temporarily blocked for the other tip, and then resumed when the touch operational mode is terminated. Typically, a primary tip of the stylus is associated with a pressure sensing mechanism for sensing a threshold pressure applied on the tip associated with a touch operational mode and also for sensing different levels of pressure applied while writing. Optionally, a touch operational mode of the secondary tip is detected with a simpler mechanism such as a push button switch and/or contact switch that is activated when the tip recedes due to contact pressure and an extension of the tip engages the switch.

In some exemplary embodiments, a stylus includes a single oscillator for providing a time base for generating signals for both the primary tip and secondary tip of the stylus. Optionally, the signal transmitted by the secondary tip is different from the signal transmitted by the primary tip so that a digitizer can distinguish between input received by the primary tip and input received by the secondary tip. Optionally, the difference includes at least one of a modification in phase, frequency, amplitude, and pulse repetition rate. Optionally, at least one of amplitude shift keying (ASK), phase shift keying (PSK) and frequency shift keying (FSK) is used to modify the transmitted signal. In some exemplary embodiments, an additional modification is introduced in response to a detected touch operational state of the secondary tip. Optionally, a frequency of the signal is modified in response to a detected touch operational state. Optionally, the secondary tip only operates, e.g. transmits a signal, in a touch operational mode and does not transmit during a hover operational state. In some exemplary embodiments, both the primary and secondary tips use a same power source. Optionally, the secondary tip uses a dedicated power source. Optionally, the secondary tip uses a dedicated signal generator time base.

According to some embodiments of the present invention, a stylus includes a primary tip through which a signal is transmitted and a secondary tip that functions as a conductive object that provides input, responsive to capacitive coupling with the associated digitizer sensor, but through which no signal is transmitted. In some exemplary embodiments, the secondary tip is constructed from a conductive soft material, e.g. conductive rubber.

In some exemplary embodiments, the secondary tip is connected to earth ground (GND) via a low impedance connection. Optionally, the secondary tip includes circuitry to alternately couple the tip to GND via one of low and high impedance connection. Typically, output from the digitizer arising from the presence of a grounded conductive object is different than output obtained from the digitizer in the presence of a conductive object that is in a float state, e.g. high impedance to GND. Optionally, during one of a hover or touch operational state, the secondary tip is repeatedly switched between GND and float to provide pre-defined input to the digitizer sensor. Optionally, during a touch operational state, the secondary tip is connected to GND and during a hover operational state the secondary tip is repeatedly switched between GND and float. Optionally, low impedance can be eliminated by adding a insulating cover on the tip.

According to some embodiments of the present invention, the secondary tip is a standalone device that can be retrofitted on an existing stylus, writing utensil, and/or rod.

Optionally, the secondary tip can be used as a standalone device. According to some embodiments of the present invention, there is provided a kit with a plurality of secondary tips, each providing a distinct input to an associated digitizer sensor, e.g. distinct frequencies and/or distinct geometries of the tip for providing different output on the digitizer due to capacitive coupling. Optionally, each tip is associated with a dedicated functionality. Optionally, transmission via the secondary tip is initiated responsive to attachment to an existing stylus, e.g. using a switch that is activated responsive to attachment to an existing stylus. Typically, the oscillator and/or a portion of the circuitry in the secondary tip are powered, e.g. operated continuously even while the tip is not transmitting. Alternatively, the secondary tip operates continuously, e.g. transmits continuously and does not require activation. Optionally, the secondary tip is only operated, e.g. only transmits a signal during a detected touch operational state of the tip.

Referring now to the drawings, FIG. 1 shows a simplified diagram of an exemplary stylus including a primary tip and an exemplary secondary tip that emits a signal derived from circuitry of the primary tip in accordance with some embodiments of the present invention. According to some embodiments of the present invention, a stylus 110 includes a primary tip 20 emitting a signal 25 and a secondary tip 30 emitting a signal 35, both during operation of stylus 110. Optionally, signal 25 is transmitted by a first transmitting element associated with primary tip 20 and signal 35 is transmitted with a second transmitting element associated with secondary tip 30. Typically, the transmitting elements are formed from conductive portions of the tips.

According to some embodiments of the present invention, a signal emitted and/or transmitted by primary tip 20 and secondary tip 30 is generated and/or transmitted by circuitry 40, e.g. an application specific integrated circuit (ASIC), and is powered by a power unit 50 included in stylus 110. Typically, circuitry 40 functions as a transmitting unit. Typically, power unit 50 includes one or more batteries and/or a super capacitor, e.g. lithium batteries and/or alkaline batteries. Optionally, the batteries are rechargeable. The power supply typically provides voltage of about 1.5V-3.5V, e.g. 1.5V, 3.2V, or other stable voltage generated by a power management solution, e.g. DC to DC converter. Optionally, a regulating converter is used to obtain stable voltage over a life time of the battery, e.g. to maintain a steady performance.

Typically circuitry 40 includes an oscillator, e.g. a multi-vibrator or crystal interface that generates a signal with frequency between about 2 KHz and 1000 KHz, e.g. 20-40 KHz. Optionally, burst signals are used for transmission, and circuitry 40 generates burst signals every 5-20 msec, e.g. every 7.5 msec or every 15 msec. In some embodiments, a signal with amplitude of up to 25V is transmitted. Typically, the signal generated by circuitry 40 is transmitted via a conductive portion of primary tip 20. Optionally, circuitry for generating the signal is connected on one end to the conductive portion of primary tip 20 and on another end to a conductive portion 95 of housing 90. Typically conductive portion 95 surrounds primary tip 20 so that an electric field concentric with a geometry of the tip is created between conductive portion of primary tip 20 and conductive portion 95 as described in more details for example in incorporated U.S. Pat. No. 7,292,229. Alternatively, the generated signal is transmitted via an antenna proximal to primary tip 20, e.g. surrounding primary tip 20, e.g. as when primary tip 20 is formed from non-conducting material.

According to some embodiments of the present invention, a writing tip of the stylus, e.g. primary tip 20 is associated with a pressure sensing unit 28 for monitoring pressure applied on primary tip 20. Typically, pressure sensing unit 28 detects a switch between no or low pressures applied on the tip during a hover operational state and higher pressures applied during a touch operational state, and provides output indicating the current operational state of the primary tip. Optionally, primary tip 20 and/or pressure sensing unit 28 may be similar to the transmitting tip and/or to a pressure sensing unit described in U.S. Patent Application Publication No. 2010-0051356, entitled "Pressure Sensitive Stylus for a Digitizer," the contents of which is hereby incorporated by reference.

In some exemplary embodiments, pressure sensing unit 28 provides input to circuitry 40 and a modulated signal is generated based on a pressure level detected by pressure sensing unit 28. Optionally, repetition rate of the generated and/or transmitted bursts is altered, e.g. bursts are transmitted every 7.5 msec during a touch operational state and every 15 msec during a detected hover operational state. Optionally, a frequency of the transmitted oscillating signal is altered and/or the phase of the oscillating signal is altered.

According to some embodiments of the present invention, stylus 110 additionally includes a secondary tip and/or secondary end 30 through which a signal 35 is transmitted. According to some embodiments of the present invention, a time base for signal 35 is generated with an oscillator associated with circuitry 40 and modification and/or conditioning of signal 35 is performed with signal processor and/or circuitry 60 so that a signal transmitted by secondary tip 30 is distinguishable from a signal 25 transmitted from primary tip 20. Optionally, phase and/or frequency of signal generated by circuitry 40 are modified. Optionally, circuitry 60 includes a frequency divider and modification is based on frequency dividing. Optionally, circuitry 60 includes functionality of a voltage controlled oscillator (VCO) and/or a multi-vibrator. Optionally, circuitry 60 functions as a transmitting unit.

Typically, the amplitude of signal 35 transmitted via secondary tip 30 is significantly lower than the amplitude of signal 25 transmitted via primary tip 20. Optionally, the amplitude of signal 35 is at most half the amplitude of signal 25. Optionally, amplitude of signal 35 is between 0.05-0.75 times the amplitude of signal 25, e.g. 0.1-0.5 times the amplitude of signal 25. In some exemplary embodiments, low signal to noise ratio (SNR) detection due to the lower power transmission is compensated for by using a larger diameter tip, e.g. diameter 'D' over which signal 35 is transmitted as compared to a diameter 'd' over which signal 25 is typically transmitted. Typically, secondary tip 30 has a rounded symmetrical shape, although other shapes may be adapted depending on the assigned functionality of the secondary tip. Optionally, secondary tip 30 has a hemispherical or dome shape. Optionally a 2-10 mm diameter tip is used for secondary tip 30, e.g. a 6 mm diameter tip. Typically, a diameter of primary tip 20 is between 0.75-2 mm, e.g. 1 mm.

Typically, secondary tip 30 is movable with respect to housing 90 of the stylus and recedes toward housing 90 in response to pressure applied on the tip. Typically, an elastic element 38 associated with the secondary tip 30 provides a recoil force responsive to contact pressure applied on the tip. In some exemplary embodiments, a touch operational state of secondary tip 30 is detected based on output from a tip position detecting unit including a switch 65. Optionally, in response to secondary tip 30 receding into housing 90, contact between an element 32 rigidly connected to tip 30 is established and switch 65 is activated and/or changes its state. Optionally, switch 65 is replaced with another pressure sensing mechanism. Typically, switch 65 provides input to circuitry 60 for modifying signal 35 while switch 65 is activated. Typically, a state of switch 65 can indicate one of an ON or OFF state but does not detect a range of pressure as does pressure sensing unit 28. Although, functionality of switch 65 is limited as compared to that of pressure sensing unit 28, power consumption and bill of materials may be significantly lower. The present inventors have found that for functionalities typically associated with a secondary tip of a stylus, e.g. erasing and/or marking, a user will typically press down on the secondary tip with high pressure so that high sensitivity is not required to differentiate between a hover and touch operational state.

Optionally, phase and/or frequency of signal 35 are modified so that touch and hover operational states of secondary tip 30 can be differentiated during interaction with a digitizer sensor. Typically, a frequency emitted by secondary tip 30 is between 2 KHz-1000 KHz. Optionally, circuitry 60 includes a frequency divider for altering a frequency of a signal generated by circuitry 40. Optionally, a lower frequency signal is used for a hover operational state which is the more dominant operational state, since the power consumption for lower frequency transmission on a constant capacitive load signal is lower than that of a higher frequency signal. Optionally, switch 65 and circuitry 60 are mounted on a PCB 62 associated with secondary tip 30.

Typically during operation of stylus 110, a signal 25 from primary tip 20 and signal 35 from secondary tip 30 are transmitted simultaneously. Optionally, switch 65 also provides input to circuitry 40 to block transmission through primary tip 20 while switch 65 is activated. Optionally and similarly, pressure sensing unit 28 provides input to circuitry 40 and/or 60 for blocking transmission to secondary tip 30 while a touch operational state is detected by pressure sensing unit 28.

Figure 2:
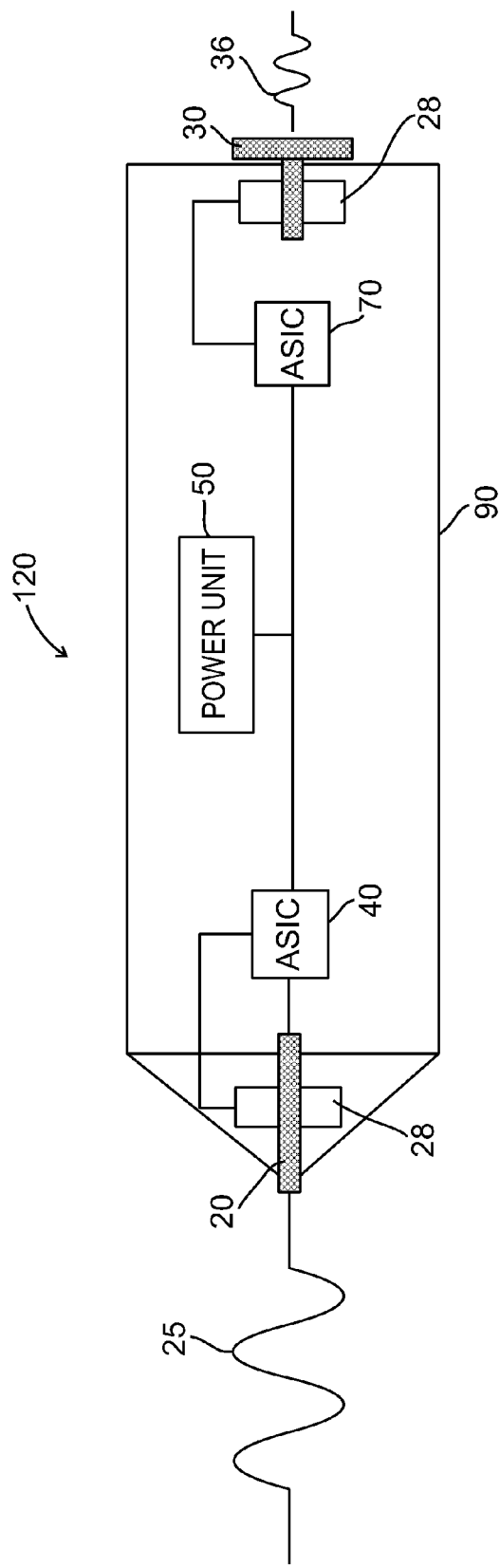
FIG. 2 is a simplified diagram of an exemplary stylus including a primary tip and an exemplary secondary tip powered with a same power unit as that of the primary tip in accordance with some embodiments of the present invention.

Reference is now made to FIG. 2 showing a simplified diagram of an exemplary stylus including a primary tip and an exemplary secondary tip powered with a same power unit in accordance with some embodiments of the present invention. According to some embodiments of the present invention, a stylus 120 includes a primary tip 20 emitting a signal 25 and a secondary tip 30 emitting a signal 36, both during operation of stylus 120. According to some embodiments of the present invention, each of signal 25 from primary tip 20 and signal 36 from secondary tip 30 are generated and/or transmitted independently but are powered by a common powering unit 50. Optionally, ASIC and/or circuit 40 generate a signal transmitted via primary tip 20, and ASIC and/or circuitry 70 associated with secondary tip 30 independently generates a signal transmitted via secondary tip 30. Optionally, circuitry 40 and circuitry 70 are in electrical communication and function as transmitting units for transmitting signals via tips 20 and 30 respectively. Optionally, transmission of signal 25 and signal 36 are synchronized. In some exemplary embodiments, each of primary tip 20 and secondary tip 30 are associated with a pressure sensing unit 28 for detecting different operational states of the tip, e.g. hover operational state and different pressure levels in a touch operational state. Alternatively, secondary tip 30 is associated with a push button switch and/or secondary tip 30 is not pressure sensitive. Typically, signals emitted by the primary tip 20 and secondary tip 30 are distinct. Typically, each of circuitry 40 and 70 are operable to receive input from its respective pressure sensing unit 28 and alter its output based on the received input.

Figure 3:
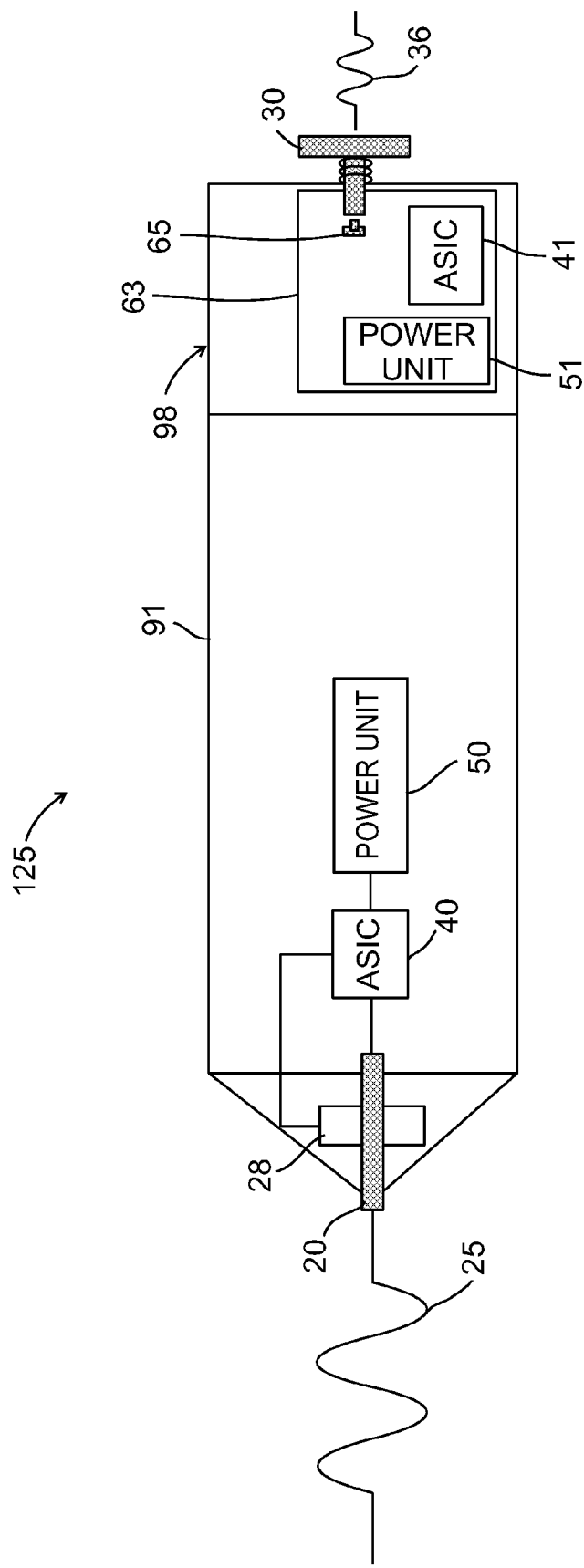
FIG. 3 is a simplified diagram of an exemplary stylus including a primary tip and an exemplary secondary tip that operates independently from the primary tip in accordance with some embodiments of the present invention.

Reference is now made to FIG. 3 showing a simplified diagram of an exemplary stylus including a primary tip and an exemplary secondary tip that operates independently from the primary tip in accordance with some embodiments of the present invention. According to some embodiments of the present invention, a stylus 125 includes a primary tip 20 emitting a signal 25 and a secondary tip 30 emitting a signal 36, both during operation of stylus 125. In some exemplary embodiments, tip 30 is associated with dedicated circuitry 41, e.g. an ASIC and a dedicated power unit 51, e.g. one or more batteries. Optionally, tip 30 is pressure sensitive and is associated with switch 65 for sensing when tip 30 is depressed, e.g. is in a touch operational state. Optionally, circuitry 41, switch 65 and power unit 51 are connected and/or mounted to a PCB 63. In some exemplary embodiments, tip 30, circuitry 41, switch 65, power unit 51 and PCB 63 are included in a secondary tip unit 98 that is operated independently from primary tip 20 and the rest of stylus 125.

Figure 4A:
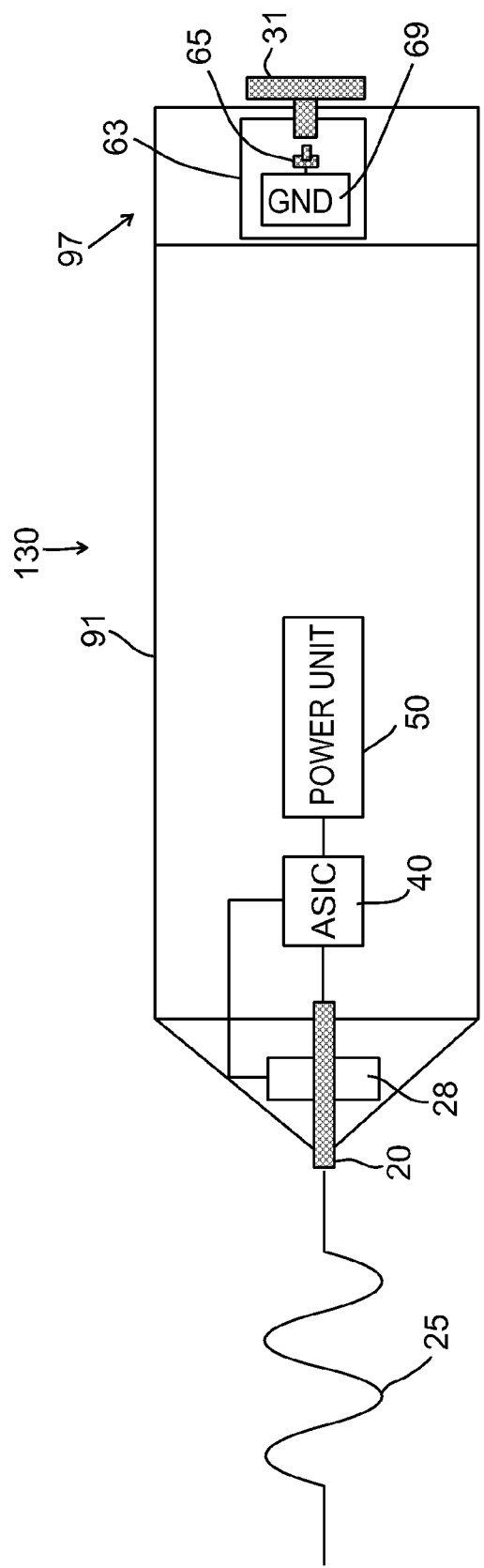
FIGS. 4A and 4B are simplified diagrams of exemplary styluses, each including a primary tip through which a signal is transmitted and an exemplary secondary tip that is a conductive object in accordance with some embodiments of the present invention.
Figure 4B:
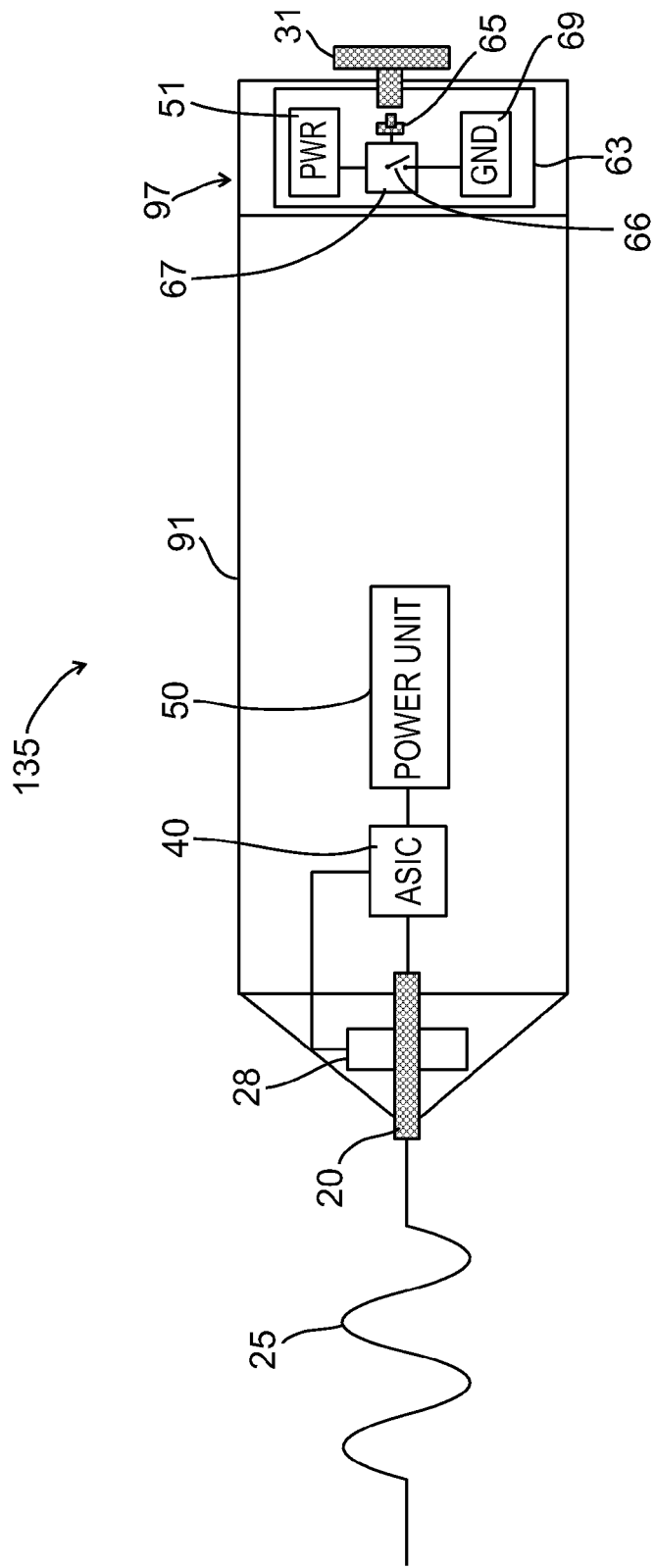

Reference is now made to FIGS. 4A and 4B showing simplified diagrams of two exemplary styluses including a primary tip through which a signal is transmitted and an exemplary secondary tip that is a conductive object in accordance with some embodiments of the present invention. According to some embodiments of the present invention, a stylus 130 and/or 135 includes a primary tip 20 emitting a signal 25 and a secondary tip unit 97 including a secondary tip 31, e.g. a non-transmitting tip constructed from a conductive object that can provide input to a digitizer sensor in a passive manner, responsive to capacitively coupling with the sensor at distinct locations on the sensor. According to some embodiments of the present invention, secondary tip 31 is constructed with a relative wide diameter tip, e.g. large relative to diameter of primary tip 20, to enhance its ability to provide input to the digitizer sensor based on capacitive coupling. Optionally secondary tip 31 is formed from a soft conductive metal.

In some exemplary embodiments, secondary tip 31 is directly connected to GND 69 by a low impedance connection, e.g. connected to a conductive portion of housing 91. Connection to GND may be by direct connection or via switch 65. Optionally, secondary tip 31 is electrically floating. Optionally, secondary tip is pressure sensitive and is alternately switched, e.g. with switch 65 between a GND state, e.g. low impedance connection to GND and a floated state, e.g. high impedance connection to GND responsive to a switch between a touch and hover operational state. In some exemplary embodiments, switch 65 is used to connect secondary tip 31 to a low impedance connection to GND 69 responsive to contact pressure applied on secondary tip 31, e.g. during a touch operational state of secondary tip 31. Optionally during a hover operational state, connection to GND is via high impedance connection. Optionally, switch 65 requires power for operation and is connected to power unit 50 and or to a dedicated power unit 51, e.g. one or more batteries.

Alternatively, during a touch operational state of tip 31, circuitry 67 provides for alternately switching between high and low impedance connection to GND, e.g. with switching mechanism 66. Optionally, switching mechanism 66 provides for switching between high and low impedance connection to GND at a frequency between 10-500 KHz. Typically, a touch operational state is activated responsive to activation of switch 65. Optionally, switch 65, circuitry 67 and power unit 51 are mounted on PCB 63 associated with secondary tip 31.

Reference is now made to FIGS. 5A and 5B showing simplified diagrams of styluses retrofitted with exemplary secondary tip units in accordance with some embodiments of the present invention. In some exemplary embodiments, secondary tip units 97 and/or 98 are independent add-on units that can be retrofitted on stylus 140 or stylus 145, e.g. known styluses. In some exemplary embodiments, a cap 99 of stylus 140 is removed and secondary tip unit 98 is positioned in its place. Optionally, housing 91 and cap 99 include screw threads so that cap 99 is removed and replaced with secondary tip unit 98 by screwing cap 99 off housing 91 and subsequently screwing secondary tip unit 98 on housing 91 of stylus 140. Alternatively, secondary tip unit 97 is used and replaces cap 99. Optionally, signal transmission is initiated responsive to attachment of secondary tip unit 98 on housing 91 of stylus 140, e.g. with a switch that is activated responsive to attaching secondary tip unit to housing 91. Alternatively, secondary tip unit 98 operates continuously and does not require initiation for it to begin transmitting.

Referring now to FIG. 5B, according to some embodiments of the present invention, secondary tip unit 97 includes an attaching mechanism 88 for fitting e.g. temporarily fitting secondary tip unit 97 over a stylus 145 and or other writing utensil and/or pointing device without requiring removal of a cap, e.g. cap 99. Optionally, secondary tip unit 98 includes an attaching mechanism 88 and is fitted, e.g. temporarily fitted over a stylus 145. Optionally, attaching mechanism 88 includes an elastic band and/or sleeve that can be friction fitted over housing 90 of stylus 145 or other object with a suitable diameter.

Figure 6:
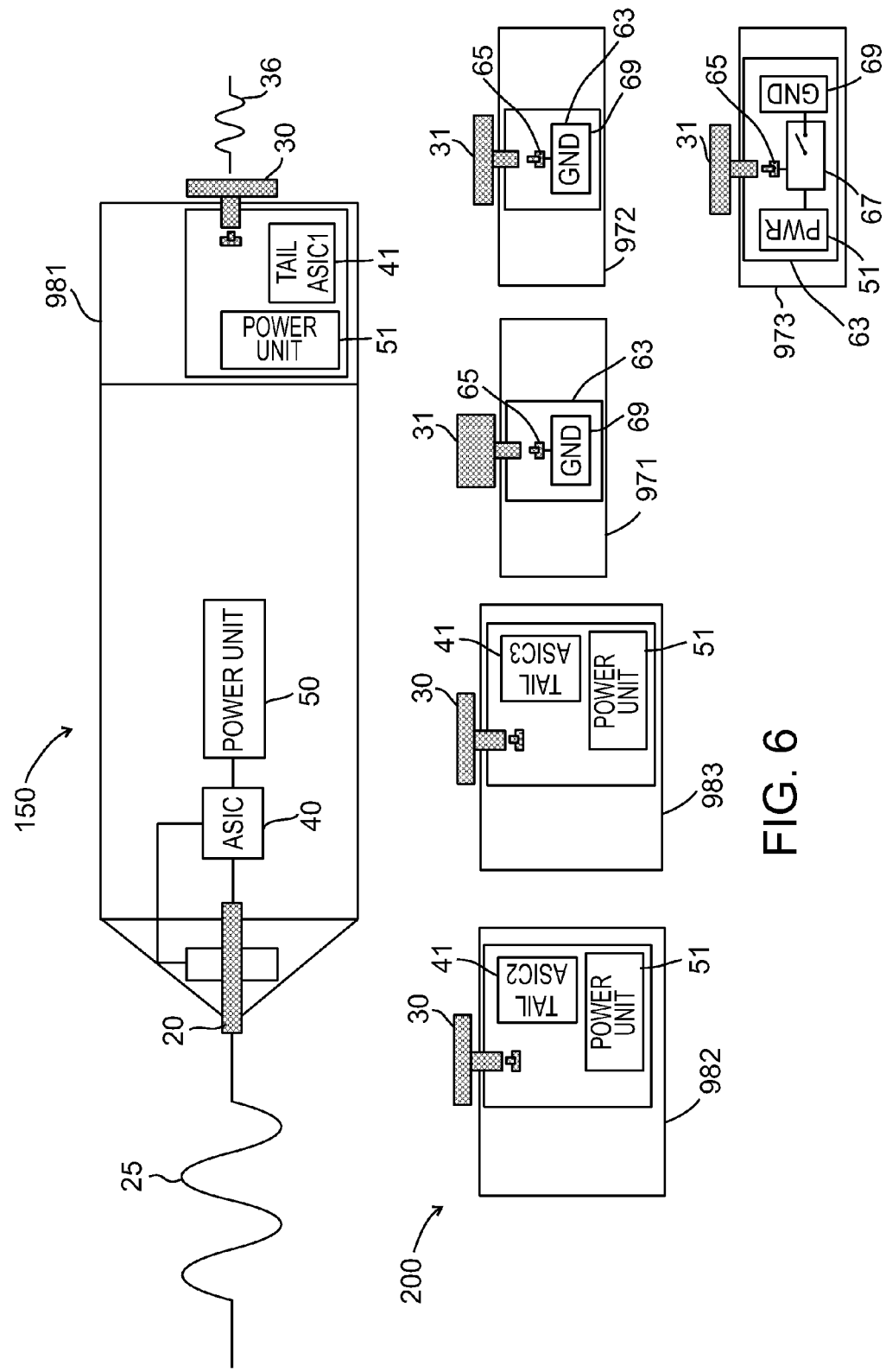
FIG. 6 is a simplified schematic diagram of a stylus with a primary tip and a plurality of exemplary secondary tips that can be selectively mounted on the stylus in accordance with some embodiments of the present invention.

Reference is now made to FIG. 6 showing a simplified schematic diagram of a stylus with a primary tip and exemplary secondary tips that can be selectively mounted on the stylus in accordance with some embodiments of the present invention. According to some embodiments of the present invention, there is provided a kit 200 including a plurality of secondary tip units each of which can be attached to a stylus 150. In some exemplary embodiments, kit 200 includes a plurality, e.g. two or more secondary tip units each emitting a signal, e.g. secondary tip units 981, 982 and 983. In some exemplary embodiments, kit 200 includes a plurality, e.g. two or more secondary tip units that provide a different capacitive coupling, e.g. secondary tip units 971, 972 and 973. Optionally, kit 200 includes both signal emitting secondary tip units and non-signal emitting secondary tip units, e.g. 971, 972, 973, 981, 982 and 983. According to some embodiments of the present invention, each of secondary tips 971, 972, 973, 981, 982 and 983 are assigned dedicated functionality. Optionally, each of secondary tip units 981, 982 and 983 include same and/or similar hardware but provide different frequency and/or repetition rates. In some exemplary embodiments, one of the secondary tips is assigned the functionality of an eraser. Optionally, one tip is assigned the functionality of a wider eraser and another tip is assigned the functionality of a narrow or thin eraser. In some exemplary embodiments, some of the secondary tips in kit 200 are assigned the functionality of drawing with a specific color and/or a specific line width. Optionally, functionality of each of the secondary tips in kit 200 can depend on an application being used. Optionally, a user may assign and/or select a functionality of one or more secondary tips, e.g. by selecting a virtual button on an associated display unit. Typically, each of the secondary tips in kit 200 provides output that can be distinguished from output provided by the other secondary tips in kit 200. It is noted that although each of the secondary tip units are shown to include a switch 65 for sensing one of a touch or hover state of the tip, one or more of the tips can alternatively include a pressure sensing unit 28 and/or may not include pressure sensing ability, e.g. may not include switch 65 or pressure sensing unit 28. Optionally, one or more of tips 30 or 31 are fixedly connected to secondary tip unit so that they are not moved in response to contact pressure applied on the tip.

Figure 7:
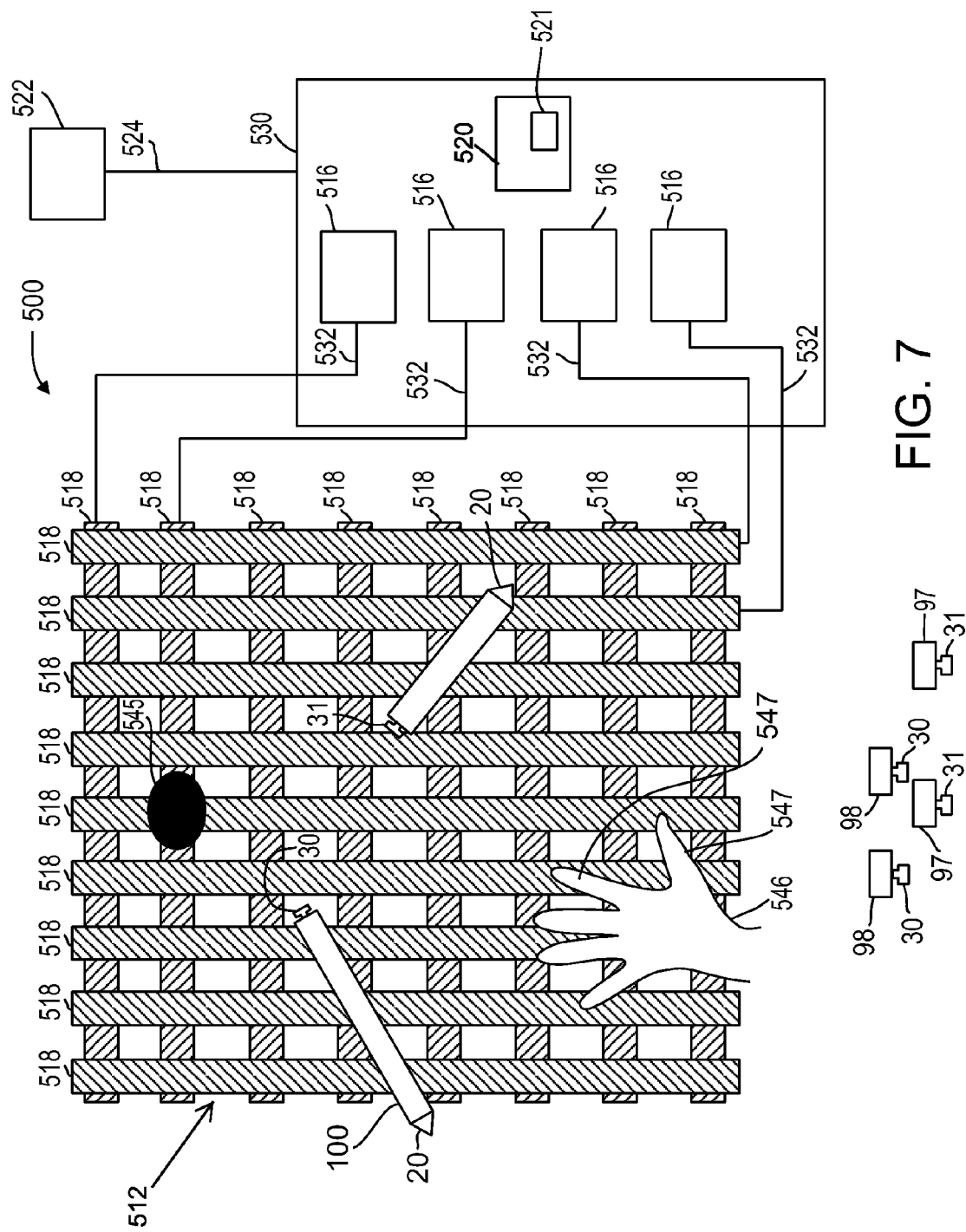
FIG. 7 is a simplified schematic diagram of exemplary digitizer system for use with a stylus including a primary and secondary tip in accordance with some embodiments of the present invention.

Reference is now made to FIG. 7 showing a simplified schematic drawing of exemplary digitizer system in which a stylus including a primary and secondary tip is used in accordance with some embodiments of the present invention. According to some embodiments of the present invention, a stylus 100 including both primary tip 20 and secondary tip 30 and/or a stylus 100 including both primary tip 20 and secondary tip 31 is used to interact with a digitizer sensor 512 of a digitizer system 500. It is noted that stylus 100 generally refers to any one or more of stylus 110, 120, 125, 130, 135, 140, 145 and 150 described herein.

Digitizer system 500 may typically be suitable for any computing device that enables touch input between a user and the device, e.g., mobile, desktop, or tabletop computing devices that include, for example, flat panel display (FPD) screens. Examples of such devices include Tablet PCs, touch enabled lap-top computers, tabletop computer, PDAs or any hand held devices such as palm pilots, mobile phones, navigation systems or any other devices that facilitate electronic gaming. According to some embodiments of the present invention, digitizer system 500 comprises a sensor 512 including a patterned arrangement of conductive lines 518, which is optionally transparent, and which is typically overlaid on an FPD. Typically sensor 512 is a grid based sensor including horizontal and vertical conductive lines.

According to some embodiments of the present disclosure, the grid generally comprises two sets of conductive lines 518, wherein each set comprises spaced apart conductive lines, and wherein conductive lines of different sets cross each other at junctions, but no contact exists between conductive lines belonging to the two sets. In some embodiments, each of the two sets comprises substantially equally spaced apart parallel straight conductive lines, wherein the two sets are substantially orthogonal ones, although other arrangements can be designed. In some non-limiting embodiments, the parallel conductive lines are spaced at a distance of approximately 2-8 mm, e.g. 4 mm, depending on the size of the FPD and a desired resolution. The two sets can be formed on one or more layers, as long as two conductive lines of belonging to two sets are isolated from one another. Optionally, the conductive lines are formed as thin lines, rectangles, diamonds, a sequence of one or more rhombuses, or any other shape.

According to some embodiments of the present invention, a signal emitted by one of primary tip 20 and secondary tip 30 (and/or secondary tip 31) of a stylus 100 is detected by sensor 512. Optionally, a signal transmitted by a stylus tip at a height of up to 4 cm above sensor 512 is detected by sensor 512. Optionally, when one of primary tip 20 or secondary tip 30 (or secondary tip 31) of a stylus 100 is positioned in proximity to sensor 512, output from the other tip is not detected by sensor 512. Optionally, while primary tip 20 is being used to interact with digitizer sensor 512, output from secondary tip 30 is not detected by digitizer sensor 512. In some exemplary embodiments, secondary tip 31 provides input to digitizer sensor 512 responsive to capacitive coupling formed between secondary tip 30 and one or more conductive lines 518 of sensor 512. Typically, input to digitizer sensor 512 responsive to capacitive coupling formed between secondary tip 30 and one or more conductive lines 518, is detected responsive to a triggering pulse and/or signal applied to one or more of conductive lines 518 as is discussed in further detail herein below.

According to some embodiments of the present disclosure, circuitry associated with digitizer sensor 512 includes one or more ASICs 516 electrically connected to conductive lines or areas 518 by connection 532 and mounted on one or more PCBs 530. Each ASIC 516 typically comprises circuitry to stimulate, sample, process and convert the sensor's output into a digital representation. Optionally, the digital output is forwarded to a digital unit 520, e.g. digital ASIC unit for further digital processing and for determining locations of input to digitizer sensor 512. Optionally, digital unit 520 is also mounted on PCB(s) 530.

According to some embodiments of the invention, digital unit 20 receives the sampled data from ASIC 516, reads the sampled data, processes it and determines and/or tracks position of physical objects, such as one or more styluses 100, one or more tokens 545, one or more hands 546, and/or one or more fingers 547. In some exemplary embodiments of the present invention, hovering of an object, e.g. stylus 100 or hand 546 and/or one or more fingers, may also be detected and processed by digital unit 520. Calculated position and/or tracking information is forwarded to the host computer 522 via interface 524. Typically, digital unit 520 and/or digitizer system 500 is able to detect more than one simultaneous interactions with digitizer sensor 512, e.g. more than one finger touches and/or stylus touches.

According to some embodiments of the present invention, digital unit 520 includes a processing functionality and/or block 521 for differentiating between input obtained from a variety of different tips of stylus 100, e.g. primary tip 20, secondary tip 30, secondary tip 31 and also for differentiating between input obtained when a tip is touching or hovering over sensor 512. According to some embodiments of the present invention, processing block 521 provides capability for differentiating between different types of secondary tips 30 and/or different types of secondary tips 31. Optionally, processing block 521 differentiates between the different tips based on a frequency, amplitude, phase or pattern formed by input provided to digitizer sensor 512. Optionally, during a course of interaction with digitizer system 500, a secondary tip of a stylus 100 may be exchanged for an alternate tip providing alternate functionality. Typically, information identifying a specific tip in use and/or an operational state of that specific tip in use is forwarded to host 522. Typically, information identifying a specific tip and/or an operational state of that specific tip is used to alter a display on an electronic screen associated with host 522.

According to some embodiments, in order to detect hand 546, finger 547, token 545, and/or secondary tip 31, digital unit 520 produces and sends one or more triggering pulses to at least one of the conductive line 518 at a time, and measures the signal on the same conductive lines or on other conductive lines 518, e.g. orthogonal conductive lines. Typically the triggering pulses and/or signals are analog pulses and/or signals. Optionally, the triggering pulses and/or signals are confined to one or more pre-defined frequencies, e.g. any sub-range also referred to as "frequency window" of about 20 to about 1000 KHz, within the frequencies of about 15 to about 200 KHz.

Typically in response to token 545 and/or secondary tip 31 (in an electric float state) positioned over and/or near a junction between two orthogonal conductive lines, a coupled signal at the junction is increased by about 0.5-20%, e.g. 5-10%. Optionally, the increase in the coupled signal is responsive to increased capacitive coupling between a triggered conductive line and passive conductive line, e.g. a line that is not triggered. Typically, a degree of change in the coupled signal is a function of material that is used to form token 545 and/or secondary tip 31 and/or dimensions of token 545 and/or secondary tip 31, e.g. shape and size of the token and secondary tip 31. Typically, while secondary tip 31 is connected to GND, a coupled signal at the junction is decreased. Optionally, by alternating between grounding and floating secondary tip 31, an oscillating output and/or output with a pre-defined pattern is obtained by sensor 512. Typically, in response to a hand or a finger over and/or near a junction between two orthogonal conductive lines, a coupled signal at the junction is reduced by about 1-30%, e.g. 3-5%.

Typically, output from the digitizer sensor is forwarded to a host 522 via an interface 524 and the output is further processed by an operating system of host 522 and/or any application executed thereby.

According to some embodiments of the present invention, digital unit 520 and ASIC 516 serve as the controller of the digitizer system and/or have functionality of a controller and/or processor. According to some embodiments of the present invention, digital unit 520 together with ASIC 516 includes memory and/or memory capability. Memory capability may include volatile and/or non-volatile memory, e.g., FLASH memory.

According to some embodiments of the invention, host 522 includes at least a memory unit and a processing unit to store and process information obtained from ASIC 516 and/or digital unit 520. According to some embodiments of the present invention memory and processing functionality may be divided between any of host 522, digital unit 520, and/or ASIC 516 or may reside in only host 522, digital unit 520 and/or there may be a separated unit connected to at least one of host 522, and digital unit 520. According to some embodiments of the present invention, one or more tables and/or databases may be stored to record data and/or outputs, e.g. images or patterned outputs of sensor 512, sampled by ASIC 16 and/or calculated by digitizer unit 520. In some exemplary embodiments, a database of data from sampled output signals may be stored. Data and/or signal values may be stored in volatile and nonvolatile memory.

Further details describing operation of digitizer system 500 can be found for example in incorporated U.S. Pat. No. 7,292,229 and in incorporated U.S. Pat. No. 7,843,439. It will be appreciated that the disclosed digitizer system is exemplary only and is not meant to limit the scope of the disclosure. Rather, the disclosed stylus can be operated with any suitable digitizer system or circuitry design associated with a digitizer sensor, including for example a combined single chip.

In the description below and in particular when referring to detected locations, the terms digitizer and sensor may be used interchangeably, and may typically refer to a sensing surface on which stylus 100 is used.

Figure 8:
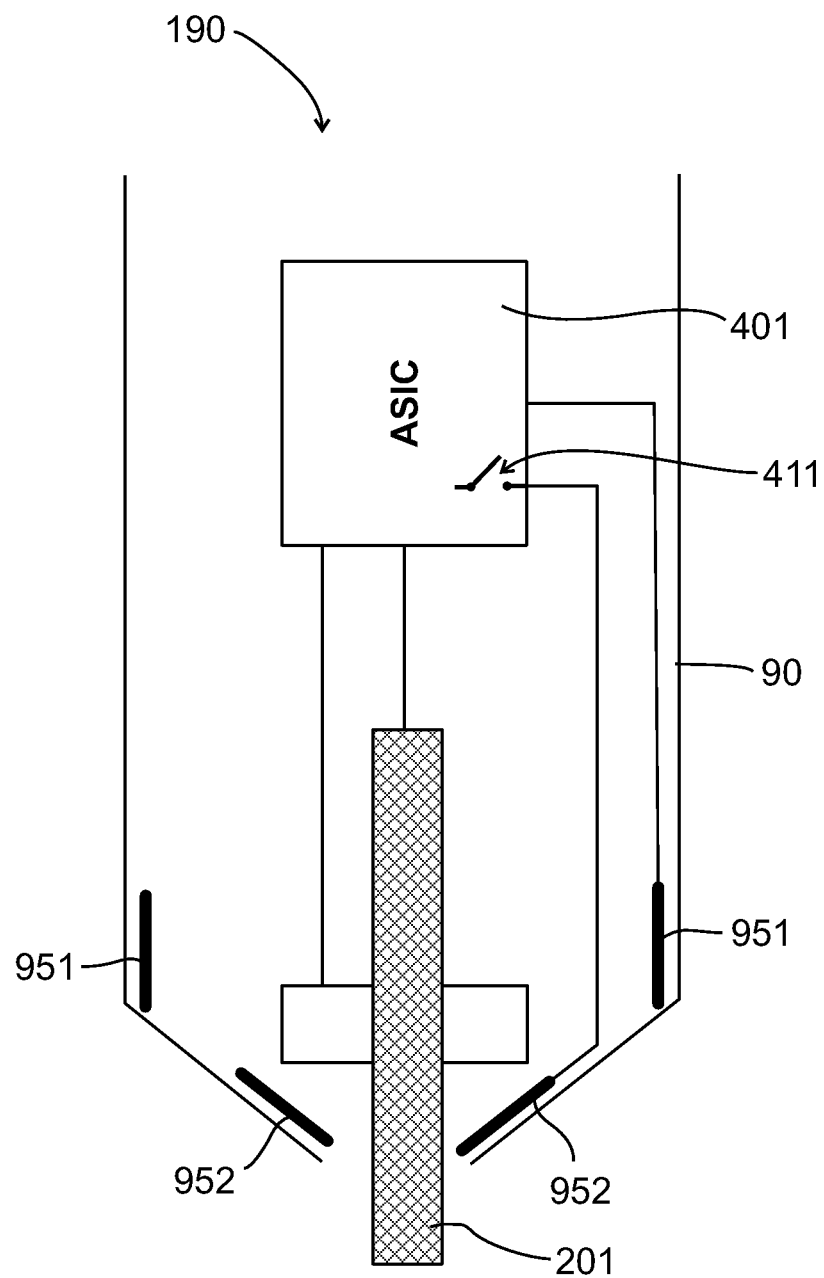
FIG. 8 is a simplified schematic diagram of an exemplary primary or secondary tip of a stylus in accordance with some embodiments of the present invention.

Reference is now made to FIG. 8 showing a simplified schematic diagram of an exemplary primary and/or secondary tip of a stylus in accordance with some embodiments of the present invention. The present inventors have found that by enlarging a conductive area surrounding a stylus tip, an area over which a stylus transmits can be enlarged and an ability to detect a presence of the stylus may be improved. Optionally, this feature provides improved awareness of the digitizer to the stylus during a hover operational state. According to some embodiments of the present invention, a conductive portion of tip 201 is surrounded by more than one conductive ring and/or section, e.g. conductive rings 951 and 952, and is electrically isolated from the conductive rings. Optionally, conductive rings 951 and 952 are coated on a housing 90 of a stylus 190 and/or are an integral part of housing 90. Typically, housing 90 additionally includes an insulating section for electrically isolating an area between rings 951 and 952.

According to some embodiments of the present invention, circuitry included in an ASIC 401, for generating a transmission signal is connected at one end to a conductive portion of tip 201 and at another end to one or more conductive rings 951 and/or 952 by selective connection. In some exemplary embodiments, ASIC 401 is operable to selectively connect and disconnect to ring 952 with a switch 411. Typically, by connecting to more than one conductive area, an effective area for transmission can be increased or decreased. Optionally, by connecting ring 952, an effective conductive area provided by the rings is doubled and/or increased by at least 50%.

Optionally, selective connection is responsive to input provided by a pressure sensing unit 28. Alternatively and/or additionally, selective connection is responsive to a user command, e.g. obtained by button selection. Optionally, for a stylus that provides two-way communication, selective connection is responsive to input provided by an associated digitizer sensor.

In some exemplary embodiments, during a hover operational state, ASIC 401 connects to both ring 951 and 952 during transmission to provider transmission over a wider area. Optionally, during a touch operational state connection to ring 952 is broken, and transmission is obtained between tip 201 and ring 951 so that a more localized transmission signal can be obtained, e.g. as is typically desired to improved location detection. Optionally, ASIC 401 additionally provides for generating a first amplitude signal while transmitting over a smaller area, e.g. while only one of conductive rings 951 and 952 are connected for transmission and for generating a second amplitude signal while transmitting over a larger area, e.g. while both conductive rings 951 and 952 are connected for transmission. Optionally, a lower amplitude signal is transmitted during a touch operational state since the proximity of the stylus to touch sensor improves reception of the transmitted signal.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A stylus comprising:
   a primary tip associated with a first conductor, the first conductor having a first diameter;
   a second tip associated with a second conductor, the second conductor having a second diameter that is larger than the first diameter;
   a transmitter configured to transmit a first signal with a first amplitude via the first conductor and for transmitting a second signal with a second amplitude via the second conductor, wherein the first amplitude is at least twice the second amplitude; and
   wherein the second amplitude together with the second diameter is selected to provide for detecting the second signal with substantially a same signal to noise ratio as compared to the first signal.

2. The stylus of claim 1, wherein the stylus includes a battery configured to power transmission of the first signal and the second signal.

3. The stylus of claim 1, wherein the stylus comprises a housing confined by a first and second end, wherein the primary tip protrudes from the first end and the second tip protrudes from the second end.

4. The stylus of claim 1, wherein the second amplitude together with the second diameter is selected to reduce power for transmitting the second signal as compared to power for transmitting the first signal.

5. The stylus of claim 1, wherein the second tip has a dome shape.

6. The stylus of claim 1, comprising a circuit configured to block transmission of the first signal based on identifying a touch operational state of the second tip of the stylus.

7. The stylus of claim 1, comprising a first transmitter configured to transmit the first signal and a second transmitter configured to transmit the second signal, wherein the first transmitter and the second transmitter are operated independently.

8. The stylus of claim 7, comprising a first power unit configured to power transmission of the first signal and a second power unit configured to power transmission of the second signal, wherein the first power unit and the second power unit are independent.

9. The stylus of claim 7, wherein the second tip and the second transmitter are housed in a second housing selectively detachable from a housing of the stylus.

10. A stylus comprising:
    a primary tip associated with a first conductor, the first conductor having a first diameter;
    a second tip associated with a second conductor, the second conductor having a second diameter that is larger than the first diameter;
    a housing confined by a first and second end, wherein the primary tip protrudes from the first end and the second tip protrudes from the second end;
    a transmitter configured to transmit a first signal with a first amplitude via the first conductor and for transmitting a second signal with a second amplitude via the second conductor, wherein the first amplitude is at least twice the second amplitude;
a battery configured to power transmission of the first signal and the second signal; and
wherein the second amplitude together with the second diameter is selected to provide for detecting the second signal with substantially a same signal to noise ratio as compared to the first signal.

11. The stylus of claim 10, wherein the second amplitude together with the second diameter is selected to reduce power for transmitting the second signal as compared to power for transmitting the first signal.

12. The stylus of claim 10, wherein the second diameter is at least twice the first diameter.

13. The stylus of claim 10 comprising a first transmitter configured to transmit the first signal and a second transmitter configured to transmit the second signal, wherein the first transmitter and the second transmitter are operated independently.

14. The stylus of claim 13, comprising a first power unit configured to power transmission of the first signal and a second power unit configured to power transmission of the second signal, wherein the first power unit and the second power unit are independent.

15. The stylus of claim 13, wherein the second tip and the second transmitter are housed in a second housing selectively detachable from the housing.

16. A system comprising:
a digitizer sensor configured to sense signals transmitted by a stylus; and
the stylus comprising:
a primary tip associated with a first conductor, the first conductor having a first diameter;
a second tip associated with a second conductor, the second conductor having a second diameter that is larger than the first diameter;
a transmitter configured to transmit a first signal with a first amplitude via the first conductor and for transmitting a second signal with a second amplitude via the second conductor, wherein the first amplitude is at least twice the second amplitude; and
wherein the second amplitude together with the second diameter is selected to provide for detecting the second signal on the digitizer sensor with substantially a same signal to noise ratio as compared to the first signal.

17. The system of claim 16, wherein the digitizer sensor is a grid based digitizer sensor.

18. The system of claim 16, wherein the digitizer sensor is configured to sense finger touch with capacitive based detection.

19. The system of claim 16, wherein the digitizer sensor is configured to track location of the primary tip based on sensing the first signal and to track location of the second tip based on sensing the second signal.

20. The system of claim 16, wherein at least one of the first signal and the second signal is modulated with information.

21. The system of claim 16, wherein the stylus includes a battery configured to power transmission of the first signal and the second signal.

22. The system of claim 16, wherein the second amplitude together with the second diameter is selected to reduce power for transmitting the second signal as compared to power for transmitting the first signal.

* * * * *